(12) United States Patent
Overton et al.

(10) Patent No.: US 8,684,405 B2
(45) Date of Patent: Apr. 1, 2014

(54) GRAIN RETAINER CONSTRUCTION FOR AIR BAG INFLATOR

(75) Inventors: Douglas Earl Overton, Knoxville, TN (US); James Michael Rose, Knoxville, TN (US)

(73) Assignee: Arc Automotive Inc., Knoxville, TN (US)

( * ) Notice: Subject to any disclaimer, the term of this patent is extended or adjusted under 35 U.S.C. 154(b) by 0 days.

(21) Appl. No.: 13/473,958

(22) Filed: May 17, 2012

(65) Prior Publication Data

US 2013/0306653 A1  Nov. 21, 2013

(51) Int. Cl.
  *B60R 21/264* (2006.01)
(52) U.S. Cl.
  USPC .......................................... 280/741; 102/531
(58) Field of Classification Search
  USPC .............................. 280/741, 736; 102/530, 531
  See application file for complete search history.

(56) References Cited

U.S. PATENT DOCUMENTS

| | | | |
|---|---|---|---|
| 5,398,967 A | 3/1995 | Carothers et al. | |
| 5,564,741 A | 10/1996 | Ward et al. | |
| 5,700,973 A | 12/1997 | Siddiqui | |
| 6,095,558 A | 8/2000 | Bayer et al. | |
| 6,189,927 B1 | 2/2001 | Mossi et al. | |
| 6,584,911 B2 | 7/2003 | Bergerson et al. | |
| 6,644,206 B2 | 11/2003 | Fogle, Jr. | |
| 6,685,223 B2 | 2/2004 | Furusawa et al. | |
| 6,701,849 B2 | 3/2004 | McFarland et al. | |
| 6,832,777 B2 | 12/2004 | Tanaka | |
| 6,955,240 B2 | 10/2005 | Ahn et al. | |
| 7,134,690 B2 | 11/2006 | Furusawa et al. | |
| 7,427,082 B2 | 9/2008 | Schoenhuber | |
| 7,597,353 B2 | 10/2009 | Smith et al. | |
| 7,651,129 B2 | 1/2010 | Nakayasu et al. | |
| 7,665,762 B2 | 2/2010 | Gabler et al. | |
| 7,744,124 B2 | 6/2010 | Yamazaki | |
| 7,866,692 B2 | 1/2011 | Windhausen et al. | |
| 8,342,100 B2 * | 1/2013 | Yamazaki et al. ............ | 102/530 |
| 2004/0155444 A1 | 8/2004 | Matsuda et al. | |
| 2005/0161924 A1 | 7/2005 | Schoenhuber et al. | |
| 2005/0184497 A1 | 8/2005 | Miyaji et al. | |
| 2007/0063494 A1 | 3/2007 | Saito et al. | |
| 2008/0296877 A1 | 12/2008 | Gabler et al. | |
| 2009/0115175 A1 | 5/2009 | Nishimura et al. | |
| 2009/0315307 A1 | 12/2009 | Neumayer et al. | |
| 2010/0320735 A1 | 12/2010 | Duvacquier et al. | |

\* cited by examiner

*Primary Examiner* — Keith Frisby

(74) *Attorney, Agent, or Firm* — Nixon & Vanderhye, PC

(57) ABSTRACT

A propellant grain retainer for an air bag inflator having a pressure vessel. A cantilevered finger is mounted in the pressure vessel and a propellant grain is mounted thereon. Upon assembly of the pressure vessel, the finger is deformed inwardly away from an adjacent wall of the pressure vessel to increase the air gap between the pressure vessel wall and the propellant grain to reduce heat transfer therebetween and increase the safety of the inflator.

13 Claims, 6 Drawing Sheets

Pre - Assembly

Post - Assembly

GRAIN RETAINER CONSTRUCTION FOR AIR BAG INFLATOR

BACKGROUND OF THE INVENTION

1. Field of the Invention

The present invention relates to a grain retainer construction for an air bag inflator and, more particularly, to such a construction that creates an increased gap between the propellant and the surrounding pressure vessel so that there is reduced heat transfer between them.

2. Description of the Background Art

To secure propellant grains in place in a pressure vessel of an air bag inflator, it is a common practice to utilize "fingers" or elongated retainers which extend through holes in the grains. When the grains are mounted on the retainers, they are normally in contact with or closely adjacent to the wall of the pressure vessel where they are subject to significant heat transfer from the pressure vessel wall when the pressure vessel is exposed to external heat, such as from welding or being exposed to external heat for any other reason. In such known constructions, the propellant grains mounted in the pressure vessel may be subject to auto ignition if the external heat on the pressure vessel exceeds a certain value.

It is important, therefore, to find ways of reducing the heat transfer from the pressure vessel wall to the propellant grains mounted therein to increase the safety of the inflator and also to reduce operating pressures in the pressure vessel by reducing the temperature and burn rate of the propellant grain. The new and improved grain retainer construction of the present invention is not subject to the above described disadvantages and fills the need for a new and improved grain retainer construction that increases the safety of the air bag inflator.

BRIEF SUMMARY OF THE INVENTION

The grain retainer construction of the present invention generally comprises one or more cantilevered fingers or beams which support propellant grains in the pressure vessel by extending through apertures in the grains. During the assembly of the pressure vessel, the fingers or beams are deformed inwardly away from the wall of the pressure vessel to increase the gap between the pressure vessel wall and the propellant grains mounted on the fingers or beams. In this manner, the increased gap insures minimal heat transfer as air is a poor conductor of heat compared to metals. This in turn reduces operating pressures in the pressure vessel by reducing the temperature and burn rate of the generant thus increasing the safety margin in the air bag inflator.

The fingers or beams may be deformed inwardly during assembly of the pressure vessel in various ways, such as intentional bending of the cantilevered fingers or beams, contact of the pressure vessel wall with the fingers or beams during assembly to deform them inwardly, or contact of the pressure vessel wall during assembly with some of the mounted propellant grains to deform the finger or beam supporting them inwardly. Within the scope of the present invention, it is noted that the fingers or beams may be deformed inwardly in any other suitable manner during the assembly of the pressure vessel.

DETAILED DESCRIPTION OF THE INVENTION

Figure 1:
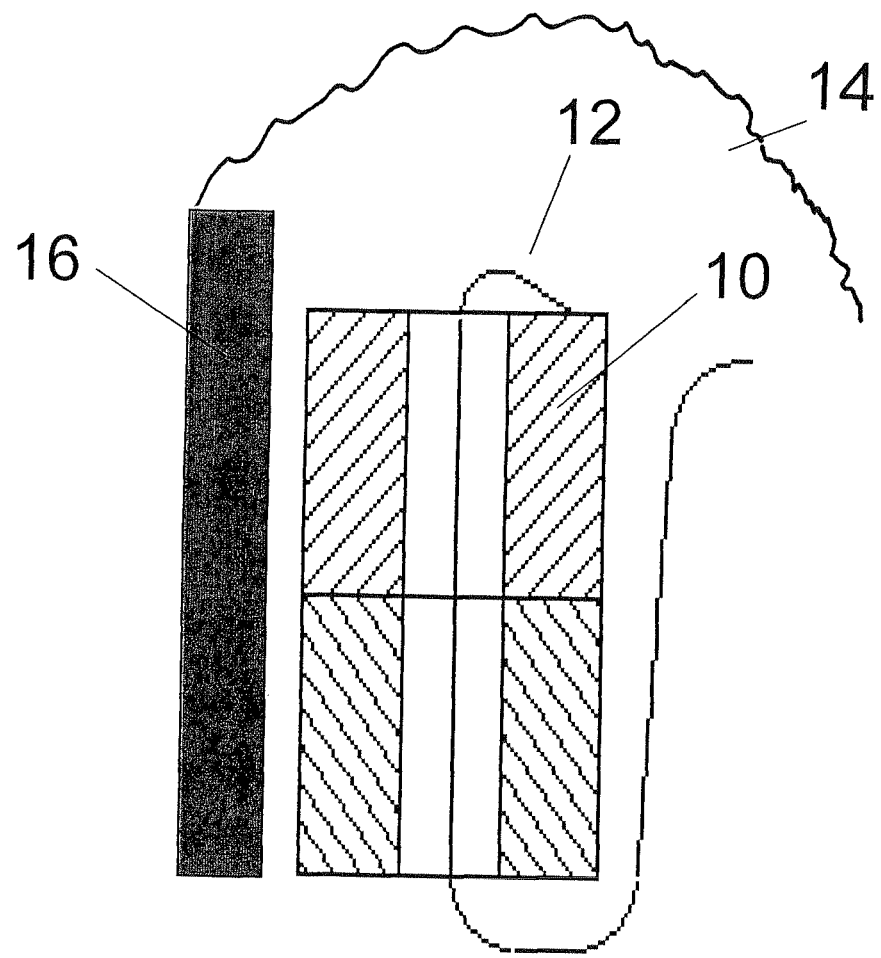
FIG. 1 is a side elevational view showing the propellant grains mounted on a cantilevered finger or beam before assembly of the pressure vessel.

As shown in FIG. 1, one ore more propellant grains 10 are mounted on a cantilevered finger or beam 12 which extends upwardly in the combustion chamber 14 enclosed by the pressure vessel wall 16.

Figure 2:
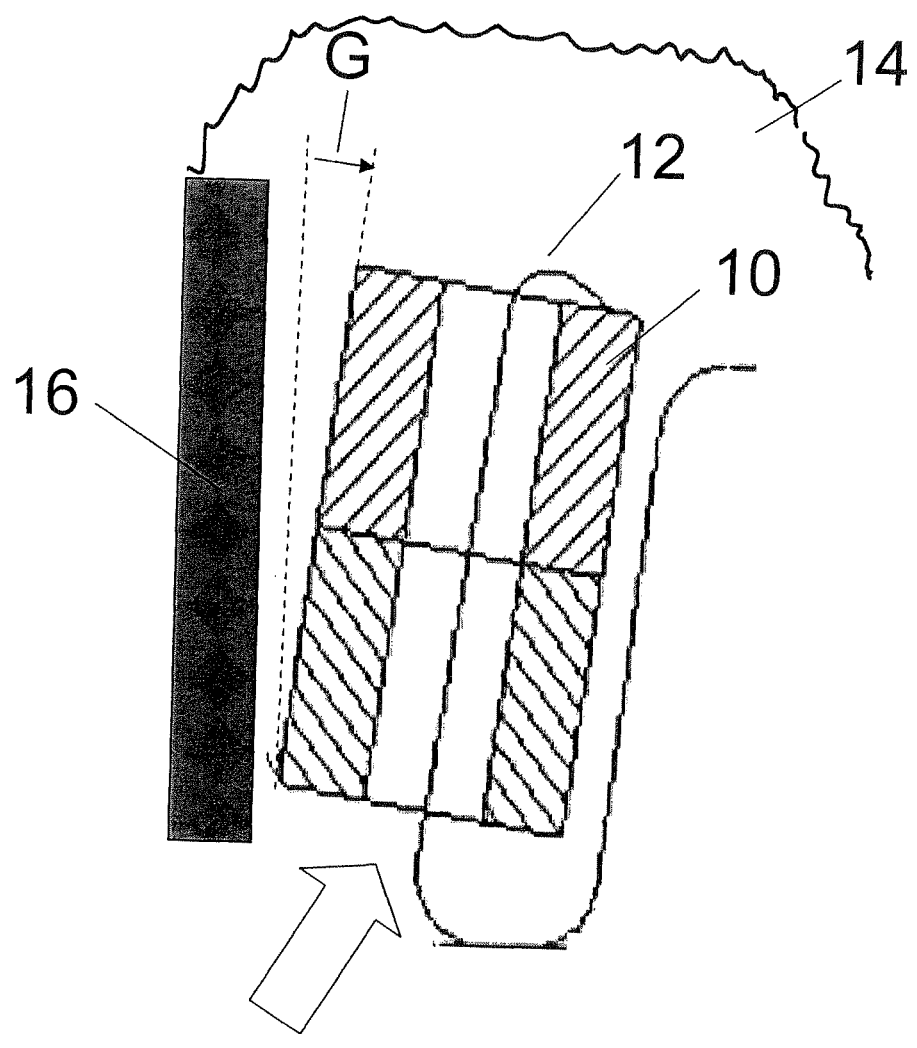
FIG. 2 is a side elevational view similar to FIG. 1 showing the inward deformation of the supporting finger or beam to increase the air gap between the propellant grains and the wall of the pressure vessel.

During the assembly of the pressure vessel, the air gap between the propellant grains 10 and the adjacent pressure vessel wall 16 is increased to reduce heat transfer therebetween by deforming the supporting finger or beam laterally inwardly as shown in FIG. 2. The finger or beam 12 may be deformed inwardly in any suitable manner, such as by manual deformation thereof or by contact of the finger or beam, or the propellant grains mounted thereon with the pressure vessel wall 16 or other contact surfaces in the pressure vessel. The increase in the air gap G between the propellant grains and the pressure vessel wall 16 reduces heat transfer therebetween which in turn reduces operating pressures in the pressure vessel by reducing the temperature and burn rate of the gas generant to increase the safety margin of the air bag inflator. The increased air gap G also reduces the possibility of auto ignition of the propellant grains when the exterior of the pressure vessel is subject to increased heat by reduced heat transfer between the pressure vessel wall 16 and the adjacent propellant grains 10.

Figure 3:
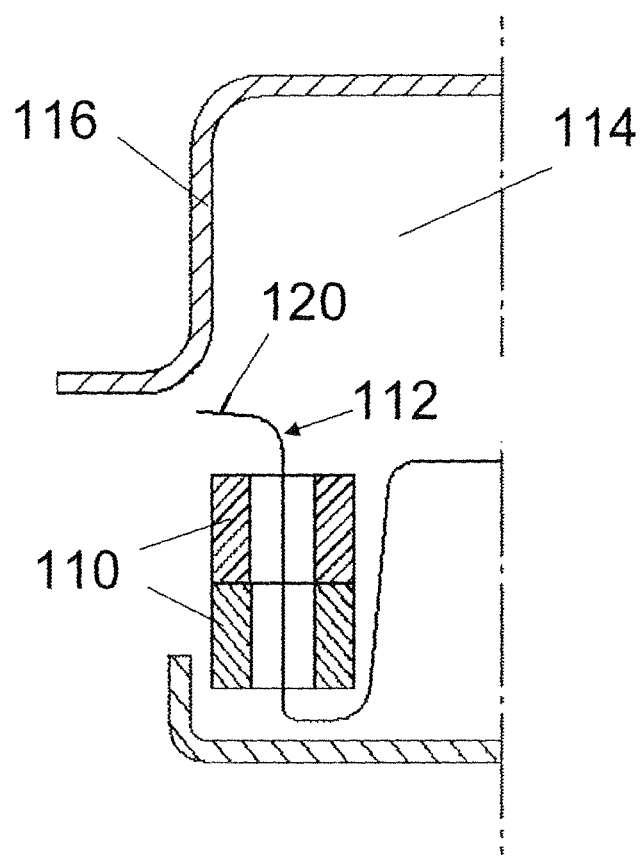
FIG. 3 is a side elevational view in section of another embodiment of the present invention prior to assembly of the pressure vessel wherein the supporting finger or beam extending through the propellant grains has a laterally extending end portion.
Figure 4:
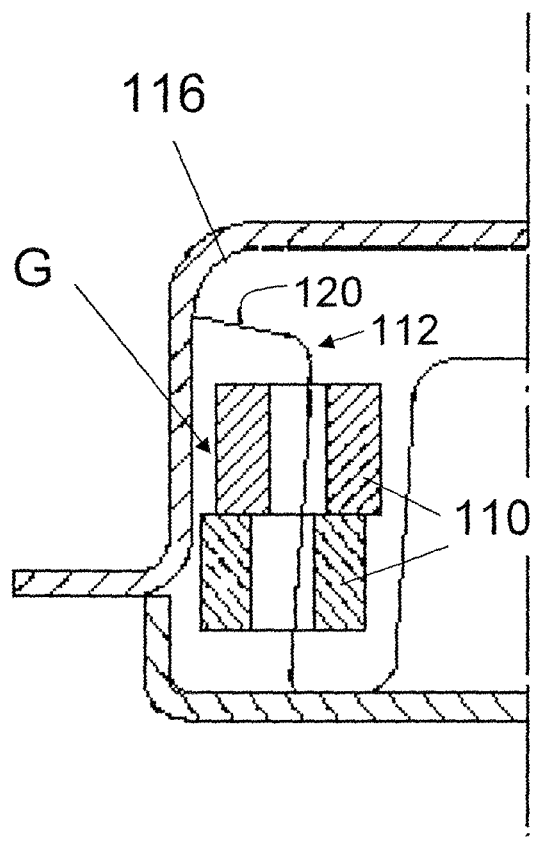
FIG. 4 is a view similar to FIG. 3 after assembly of the pressure vessel wherein the laterally extending end portion of the finger or beam in engaged by the pressure vessel wall during assembly to deform the finger or beam inwardly and increase the air gap between some of the propellant grains mounted on the finger or beam and the pressure vessel.

FIG. 3 illustrates a further embodiment of the present invention wherein the finger or beam 112 supporting the propellant grains 110 has a laterally extending end portion 120 at the upper end thereof. During assembly of the pressure vessel, the wall 116 of the combustion chamber 114 engages the laterally extending end portion 120 of the finger or beam 112 to deform it inwardly as shown in FIG. 4 to increase the air gap between the propellant grains 110 mounted on the finger or beam and the adjacent pressure vessel wall 116.

Figure 5:
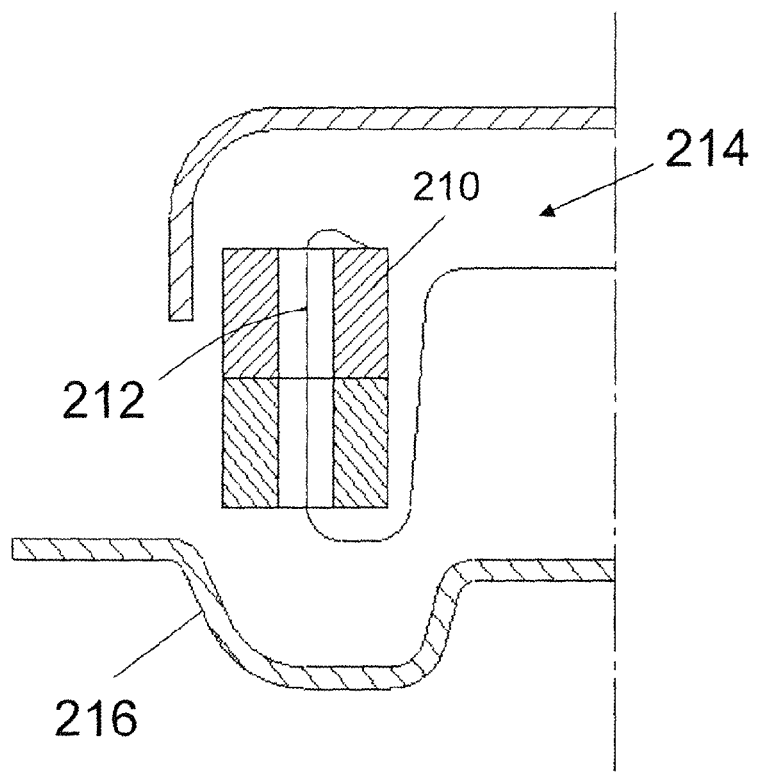
FIG. 5 is a side elevational view of a further embodiment of the present invention prior to assembly of the pressure vessel wherein the propellant grains are mounted on a cantilevered finger or beam.
Figure 6:
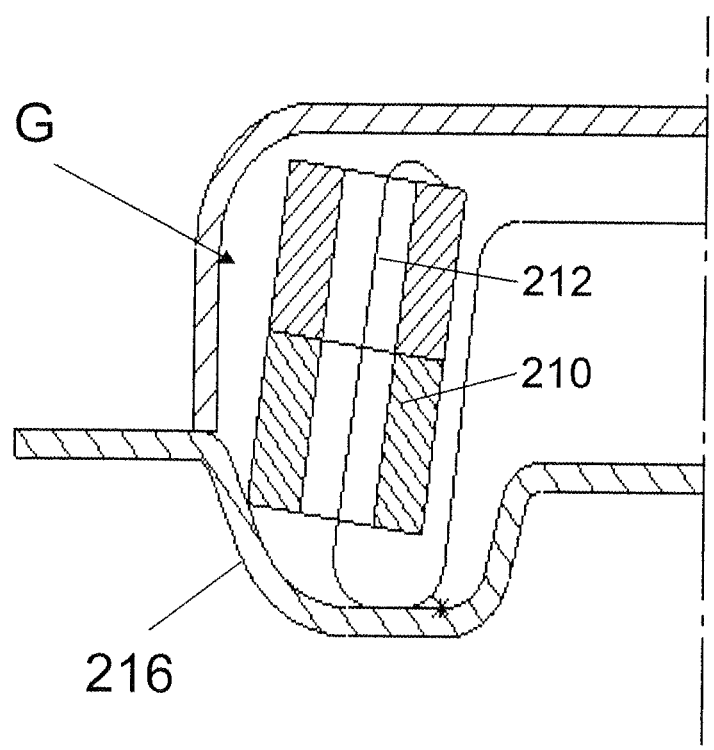
FIG. 6 is side elevational similar to FIG. 5 wherein, after assembly of the pressure vessel, the wall of the pressure vessel is in engagement with a portion of one of the propellant grains to bend the finger or beam inwardly and increase the air gap between the pressure vessel wall and the propellant grains mounted on the finger or beam.

FIGS. 5 and 6 illustrate a further embodiment of the present invention. Prior to the assembly of the pressure vessel, the propellant grains 210 are mounted on a cantilevered finger or beam 212 disposed within the combustion chamber 214. Upon assembly of the pressure vessel, the wall 216 of the pressure vessel engages the corner of the lower propellant grain 210 to deform the finger or beam 212 inwardly as shown in FIG. 6 wherein the gap between the propellant grains 210 and the pressure vessel wall 216 is increased to reduce heat transfer between the pressure vessel wall and the propellant grains.

Within the scope of the present invention, the cantilevered finger or beam 12, 112, 212 may be deformed inwardly during assembly of the pressure vessel in any suitable manner to increase the air gap between the propellant grains and the adjacent wall of the pressure vessel to reduce heat transfer therebetween and increase the safety margin of the air bag inflator.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A propellant grain retainer for an air bag inflator having a pressure vessel, comprising:
   a cantilevered finger mounted in the pressure vessel; and
   a propellant grain mounted on the finger;
   the finger being positioned in the pressure vessel such that, upon assembly of the pressure vessel, the finger is deformed inwardly away from an adjacent wall of the pressure vessel to increase an air gap between the adjacent pressure vessel wall and the propellant grain to reduce heat transfer therebetween.

2. The grain retainer of claim 1 wherein the finger is deformed inwardly by contact with the adjacent pressure vessel wall during assembly of the pressure vessel.

3. The grain retainer of claim 2 wherein an outer end of the finger extends laterally to a position wherein it is engaged by the adjacent pressure vessel wall to deform the finger inwardly.

4. The grain retainer of claim 1 wherein the finger is deformed inwardly by contact of the propellant grain mounted thereon with the pressure vessel wall.

5. The grain retainer of claim 4 wherein a corner of the propellant grain is contacted by the pressure vessel wall.

6. The grain retainer of claim 1 wherein the propellant grain has an aperture therethrough and the finger extends through the aperture to support the propellant grain thereon.

7. The grain retainer of claim 1 wherein the finger is formed of a flexible and resilient heat resistant material.

8. The grain retainer of claim 1 wherein the finger is formed of a flexible heat resistant material.

9. A method for supporting a propellant grain in a pressure vessel of an air bag inflator, comprising:
   providing a cantilevered finger in the pressure vessel;
   mounting the propellant grain on the finger; and
   deforming the finger inwardly away from an adjacent wall of the pressure vessel during the assembly thereof to increase an air gap between the adjacent pressure vessel wall and the propellant grain to reduce heat transfer therebetween.

10. The method of claim 9 wherein the finger is deformed inwardly by contact with the adjacent pressure vessel wall during assembly of the pressure vessel.

11. The method of claim 9 wherein the finger is deformed inwardly by contact of the propellant grain mounted thereon with the pressure vessel wall.

12. The method of claim 11 wherein a corner of the propellant grain is contacted by the pressure vessel wall.

13. The method of claim 9 wherein the finger is deformed manually.

* * * * *